US011487996B2

(12) United States Patent
Chowdhury et al.

(10) Patent No.: US 11,487,996 B2
(45) Date of Patent: Nov. 1, 2022

(54) REAL-TIME PREDICTIVE MAINTENANCE OF HARDWARE COMPONENTS USING A STACKED DEEP LEARNING ARCHITECTURE ON TIME-VARIANT PARAMETERS COMBINED WITH A DENSE NEURAL NETWORK SUPPLIED WITH EXOGENEOUS STATIC OUTPUTS

(71) Applicant: Dell Products L.P., Round Rock, TX (US)

(72) Inventors: Arnab Chowdhury, Bangalore (IN); Ramakanth Kanagovi, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 821 days.

(21) Appl. No.: 16/429,435

(22) Filed: Jun. 3, 2019

(65) Prior Publication Data

US 2020/0380336 A1     Dec. 3, 2020

(51) Int. Cl.
  *G06N 3/04*   (2006.01)
  *G06F 11/00*  (2006.01)
  *G06N 3/08*   (2006.01)
  *G06N 5/00*   (2006.01)
  *G06N 20/20*  (2019.01)

(52) U.S. Cl.
  CPC ......... *G06N 3/0454* (2013.01); *G06F 11/008* (2013.01); *G06N 3/04* (2013.01); *G06N 3/0445* (2013.01); *G06N 3/08* (2013.01)

(58) Field of Classification Search
  CPC ........... G06N 3/0454; G06N 3/04; G06N 3/08
  See application file for complete search history.

(56) References Cited

U.S. PATENT DOCUMENTS

| 11,232,780 B1* | 1/2022 | Iyer ......................... G10L 13/10 |
| 2018/0063168 A1* | 3/2018 | Sofka ................... G06N 3/0454 |

(Continued)

OTHER PUBLICATIONS

Joseph F. Murray et al., Machine Learning Methods for Predicting Failures in Hard Drives: A Multiple-Instance Application, Journal of Machine Learning Research 6 (2005) 783-816, published May 2005 http://jmlr.csail.mit.edu/papers/volume6/murray05a/murray05a.pdf.

(Continued)

*Primary Examiner* — Getente A Yimer
(74) *Attorney, Agent, or Firm* — Terrile, Cannatti & Chambers; Stephen A. Terrile

(57) ABSTRACT

A system, method, and computer-readable medium are provided for a hardware component failure prediction system that can incorporate a time-series dimension as an input while also addressing issues related to a class imbalance problem associated with failure data. Embodiments utilize a double-stacked long short-term memory (DS-LSTM) deep neural network with a first layer of the DS-LSTM passing hidden cell states learned from a sequence of multi-dimensional parameter time steps to a second layer of the DS-LSTM that is configured to capture a next sequential prediction output. Output from the second layer is combined with a set of categorical variables to an input layer of a fully-connected dense neural network layer. Information generated by the dense neural network provides prediction of whether a hardware component will fail in a given future time interval.

20 Claims, 14 Drawing Sheets

(56) References Cited

U.S. PATENT DOCUMENTS

2020/0175961 A1* 6/2020 Thomson ............... G10L 15/28
2021/0356581 A1* 11/2021 Keating ............... G01S 13/765

OTHER PUBLICATIONS

Doug Turnbull et al., Failure Prediction in Hardware Systems, undated http://cseweb.ucsd.edu/~dtumbul/Papers/ServerPrediction.pdf.

* cited by examiner

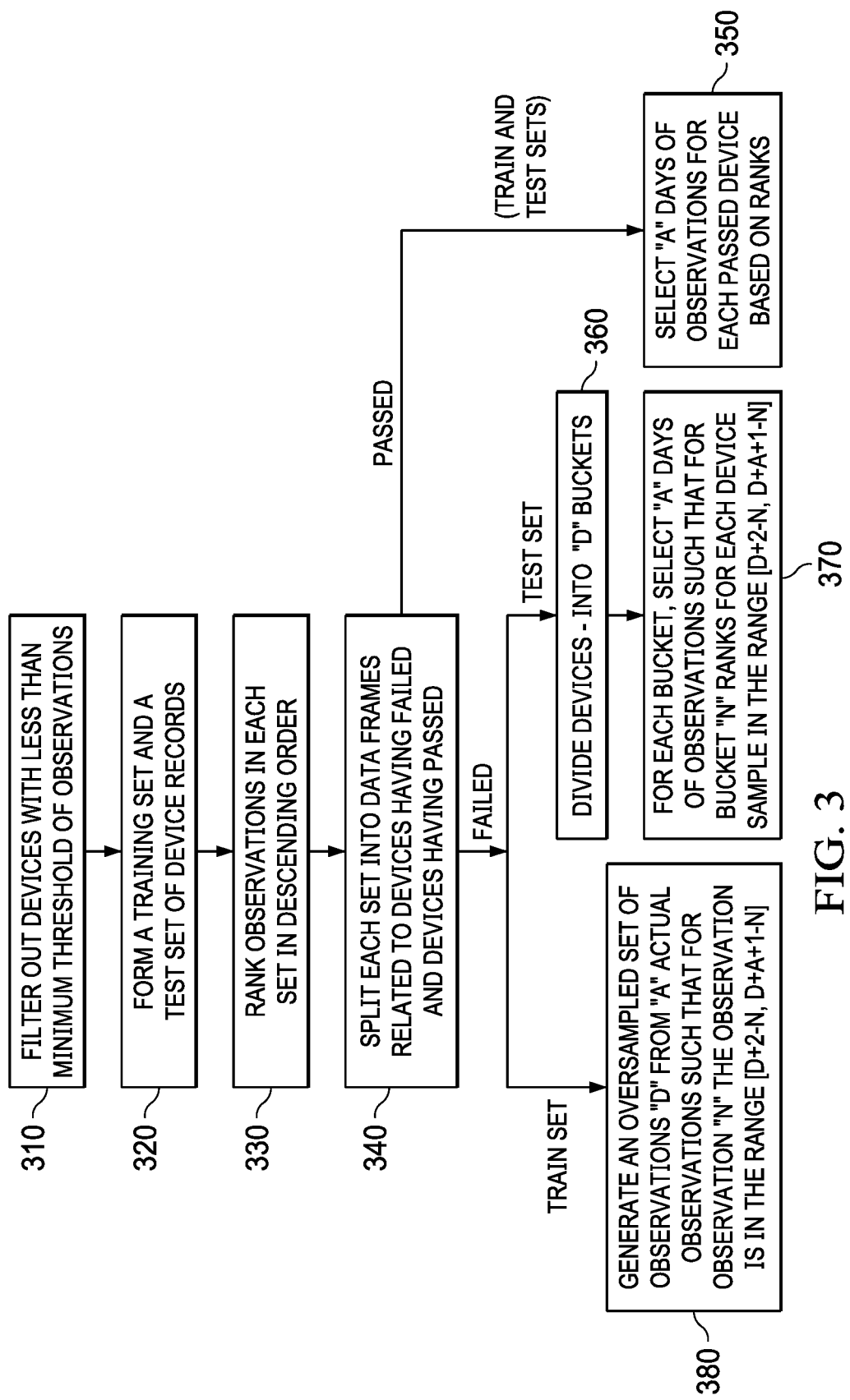

| HDD SAMPLE BUCKETS | OBSERVATION RANK FOR EACH HDD THAT HAVEN'T FAILED TILL DATE IN THE HOLD-OUT TEST SET | | | | | | | | | | | | |
|---|---|---|---|---|---|---|---|---|---|---|---|---|---|
| | 1 | 2 | 3 | ○○○ | D-1 | D | D+1 | ○○○ | A | A+1 | ○○○ | D+A-2 | D+A-1 | X |
| SAMPLE $ht_1$ | | | | | | | | | | | | | |
| SAMPLE $ht_2$ | | | | | | | | | | | | | |
| ○○○ | | | | | | | | | | | | | |
| SAMPLE $ht_{n-1}$ | | | | | | | | | | | | | |
| SAMPLE $ht_n$ | | | | | | | | | | | | | |

REAL-TIME PREDICTIVE MAINTENANCE OF HARDWARE COMPONENTS USING A STACKED DEEP LEARNING ARCHITECTURE ON TIME-VARIANT PARAMETERS COMBINED WITH A DENSE NEURAL NETWORK SUPPLIED WITH EXOGENEOUS STATIC OUTPUTS

BACKGROUND OF THE INVENTION

Field of the Invention

The present invention relates to internet of things devices. More specifically, embodiments of the invention relate to predictively determining whether an internet of things device is about to fail.

Description of the Related Art

As the value and use of information continues to increase, individuals and businesses seek additional ways to process, store, and gain value from the information. One option available to users is information handling systems. An information handling system generally processes, compiles, stores, or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Technology companies can have a large installed base of client and infrastructure solutions. Such solutions deployed in customer environments can include many types of hardware components, for example, hard disk drives, memory, processors, graphical processing units, ethernet cards, sensor devices, networking devices, and the like. Many of these hardware components are part of the internet of things (IoT), where network connectivity allows for performance and activity indicators to be reported to a central repository in the form of log files. These log files can enable detection of various indicators related to component reliability with an intent of anticipating imminent failure. Such functionality traditionally is pursued by customers in a self-serve mode or by technical support teams from supplier companies. Tracking of pre-defined parameters contained in log files can enable tracking of patterns that may indicate failure, which can allow for timely action to repair or replace the device, thereby preventing a major failure in the future. This can help ensure longevity and smooth running of a system using the hardware component. In addition, continuous monitoring of device logs allows for statistical analysis to determine end of life of the hardware component, which can be used by an operations team to plan for gradual replacement of the device.

Analysis of information contained in a large multitude of device log files can be difficult due to not only the amount of data needing to be analyzed, but also determining which data is the most important in such analysis. A hardware component's failure is usually not a straight-line prediction, where certain parameters measured beyond their boundaries always cause a fatal failure. Failures can be caused by a variety of mechanisms, such as a set of complex parameter value patterns, latent interaction between multiple parameters, or a simple breach of parameter boundary thresholds. A key to determining imminent failure of devices is to recognize patterns out of the complex mass of sequential data provided by large log files from many devices.

In order to address this problem, there have been statistical binary classification approaches for component failure prediction. But these traditional approaches do not take into consideration time component variance in a device's parameter measures. Without such consideration, accuracy and precision of the prediction method are limited, and thus decreases the value of such a method to a user or provider of hardware devices. It is therefore desirable to have a method that incorporates time series input to improve the precision of failure prediction.

SUMMARY OF THE INVENTION

A system, method, and computer-readable medium are disclosed for predicting failure of a hardware device, where the system, method, and computer-readable medium can incorporate a time-series dimension as an input while also addressing issues related to a class imbalance problem associated with failure data.

One embodiment provides a computer-implementable method for predicting failure of a hardware device, where the method includes acquiring telemetry data from a plurality of hardware devices of a same type, generating a training dataset and a validation dataset from the telemetry data where each dataset includes a set of data observations over time for each device in the dataset, training a model for predicting failure of a hardware device of the plurality of hardware devices, and tuning the model where tuning uses a modified version of the validation dataset to further rank continuous and categorical parameters related to device failure. The training uses a modified version of the training dataset. Training includes: providing cells of a first layer of a double stacked long short-term memory (DS-LSTM) network with a normalized continuous feature set of time observations for each device in the training dataset where each cell of the first layer of the DS-LSTM outputs a hidden cell state; providing the hidden cell state of each first layer cell to a corresponding cell in a second layer of the DS-LSTM where the second layer of the DS-LSTM outputs and output vector for each device in the training dataset; concatenating the output vector for a device with categorical parameters corresponding to the device from the training dataset to generate a concatenated result matrix for the device; and, providing the concatenated result matrix to a dense neural network (DNN) to identify continuous and categorical parameters related to device failure as an output from the DNN.

In one aspect of the above embodiment, the method further includes generating the modified versions of the training dataset and the validation dataset. Generating the modified versions of the datasets includes ranking the set of data observations in each of the training and validation datasets in reverse chronological order, splitting each of the training and validation datasets into a set of records associated with failed devices and passing devices, and generating an oversampled set of observations from the set of records associated with failed devices in the training dataset to address imbalance between a number of records in the set of records associated with failed devices and passing devices. In a further aspect, generating the oversampled set of observations from the set of records associated with failed devices in the training dataset further includes synthetically creating repetitive samples using a moving time window. In still a further aspect, synthetically creating repetitive samples using a moving time window further includes generating and over sampled set of observations "d" from "a" actual observations such that for observation "n" in the set of observations, the observation is in a date range characterized by [d+2−n, d+a+1−n]. In another further aspect, generating the modified versions further includes generating a set of observations from the set of records associated with failed devices in the validation dataset by further dividing the records associated with failed devices in the validation dataset into "d" buckets, and selecting for each bucket "a" days of observation such that for bucket "n" the ranks for each observation is in a range of [d+2−n, d+a+1−n].

In another aspect, the method further includes concatenating the output from the DNN to a next concatenated result matrix to form a concatenated result matrix for a next DNN calculation. In still another aspect, each of the plurality of hardware devices is an Internet of Things device configured to provide the telemetry data over a network. In yet another aspect, the method includes generating a hold-out dataset from the telemetry data. The hold-out dataset is used to determine accuracy of the model subsequent to the training and tuning, and the hold-out dataset includes entries distinct from the entries in the training and validation datasets.

Another embodiment provides a system that includes a processor, a data bus coupled to the processor, a DS-LSTM module coupled to the processor and having a plurality of first layer cells and corresponding plurality of second layer cells where each cell of the first layer cells is configured to provide a hidden cell state to a corresponding cell of the second layer cells, a dense neural network module coupled to the DS-LSTM module and the processor and configured to receive an output from the DS LSTM as an input, and a non-transitory, computer-readable storage medium that embodies computer program code and is coupled to the data bus, the computer program code interacting with a plurality of computer operations and including instructions executable by the processor. The instructions executable by the processor are configured for: acquiring telemetry data from a plurality of hardware devices of the same type; generating a training dataset and a validation dataset from the telemetry data where each dataset includes a set of data observations over time for each device in the dataset; training a model for predicting failure of a hardware device of the plurality of hardware devices; and, tuning the model where said tuning uses a modified version of the validation dataset to further rank continuous and categorical parameters related to device failure. The training uses a modified version of the training dataset. The training includes providing the plurality of first layer cells of the DS-LSTM with a normalized continuous feature set of time observations for each device in the training dataset, outputting an output vector by the second layer of the DS-LSTM for each device in the training dataset, concatenating the output vector for a device with categorical parameters corresponding to the device from the training dataset to generate a concatenated result matrix for the device, and providing the concatenated result matrix to the DNN module for identifying continuous and categorical parameters related to device failure.

In one aspect of the above embodiment, the instructions are further configured for generating the modified versions of the training dataset and validation dataset by being configured for ranking the set of data observations in each of the training and validation datasets in reverse chronological order, splitting each of the training and validation datasets into a set of records associated with failed devices and passing devices, and generating an oversampled set of observations from the set of records associated with failed devices in the training dataset to address imbalance between a number of records in the set of records associated with failed devices and passing devices. In a further aspect, the instructions for generating the oversampled set of observations from the set of records associated with failed devices in the training dataset further include instructions configured for synthetically creating repetitive samples using a moving time window. In still a further aspect, the instructions for synthetically creating repetitive samples using a moving time window further include instructions configured for generating an oversampled set of observations "d" from "a" actual observations such that for observation "n" in the set of observations, the observation is in a date range characterized by [d+2−n, d+a+1−n]. In another aspect, instructions configured for generating the modified version of the validation dataset are further configured for generating a set of observations from the set of records associated with failed devices in the validation dataset by further including instructions to divide the records associated with the failed device in the validation dataset into "d" buckets, and select for each bucket "a" days of observations such that for bucket "n" the ranks for each observation is in a range of [d+2−n, d+a+1−n].

In another aspect of the above embodiment, the instructions are further configured for generating a hold-out dataset from the telemetry data where the hold-out dataset is used to determine accuracy of the model subsequent to said training and tuning, and behold-out dataset includes entries distinct from the entries in the training and validation datasets. In another aspect of the above embodiment, the system further includes a network interface coupled to the data bus and a network, where each of the plurality of hardware devices is an Internet of things device configured to provide the telemetry data over the network.

Another embodiment of the present invention is a non-transitory, computer-readable storage medium embodying computer program code. The computer program code includes computer executable instructions configured for: acquiring telemetry data from a plurality of hardware devices of the same type; generating a training dataset and a validation dataset from the telemetry data where each dataset includes a set of data observations over time for each device in the dataset; training a model for predicting failure of a hardware device of the plurality of hardware devices; and, tuning the model where tuning uses a modified version of the validation dataset to further rank continuous and categorical parameters related to device failure. The training uses a modified version of the training dataset. Training includes providing cells of a first layer of a DS-LSTM network with a normalized continuous feature set of time observations for each device in the training dataset where each cell of the first layer of the DS-LSTM outputs a hidden cell state, providing the hidden cell state of each first layer cell to a corresponding cell in a second layer of the DS-LSTM where the second layer of the DS-LSTM outputs and output vector for each device in the training dataset, concatenating the output vector for a device with categorical parameters corresponding to the device from the training dataset to generate a concatenated result matrix for the device, and providing the concatenated result matrix to a DNN to identify continuous and categorical parameters related to device failure as an output from the DNN.

In one aspect of the above embodiment the computer executable instructions are further configured for generating the modified versions of the training dataset and the validation dataset. The instructions for generating the modified versions are configured for ranking the set of data observations in each of the training and validation datasets in reverse chronological order, splitting each of the training and validation datasets into a set of records associated with failed devices and passing devices, and generating an oversampled set of observations from the set of records associated with failed devices in the training dataset to address imbalance between a number of records in the set of records associated with failed devices and passing devices. In a further aspect, the instructions for generating the oversampled set of observations from the set of records associated with failed devices in the training dataset further include instructions for synthetically creating repetitive samples using a moving time window.

In another aspect of the above embodiment, the instructions for synthetically creating repetitive samples using the moving time window further include instructions for generating an oversampled set of observations "d" from "a" actual observations such that for observation "n" in the set of observations, the observation is in a date range characterized by [d+2−n, d+a+1−n]. In yet another aspect of the above embodiment, the instructions for generating the modified versions of the datasets further include instructions for generating a set of observations from the set of records associated with failed devices in the validation dataset by further performing steps of dividing the records associated with the failed devices in the validation dataset into "d" buckets, and selecting for each bucket "a" days of observations such that for bucket "n" the ranks for each observation is in a range of [d+2−n, d+a+1−n].

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 3 is a simplified flow diagram illustrating a set of steps involved in a data processing stage, in accord with embodiments of the present invention.

FIG. 7 is a table illustrating observation ranking for each of the HDDs that have yet to fail in the hold-out dataset.

DETAILED DESCRIPTION

Figure 1:
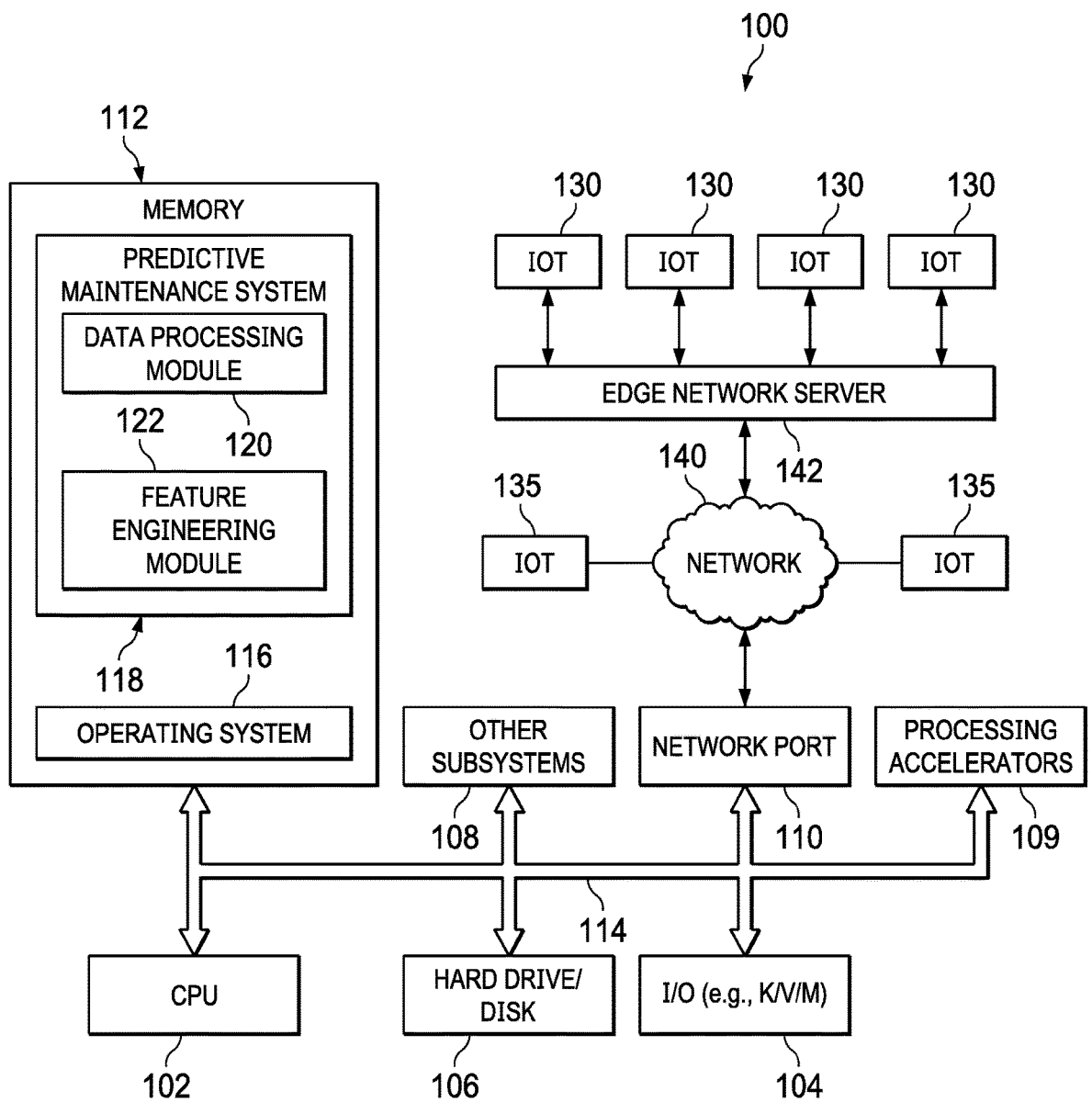
FIG. 1 is a simplified block diagram of an information handling system that can be used to implement embodiments of the present invention.

A system, method, and computer-readable medium are disclosed for a hardware component failure prediction system that can incorporate a time-series dimension as an input while also addressing issues related to a class imbalance problem associated with failure data. Embodiments provide this capability through the use of a deep learning-based artificial intelligence binary classification method. Embodiments utilize a double-stacked long short-term memory (DS-LSTM) deep neural network with a first layer of the LSTM passing hidden cell states learned from a sequence of multi-dimensional parameter time steps to a second layer of the LSTM that is configured to capture a next sequential prediction output. Output from the second layer of the LSTM is concatenated with a set of categorical variables to an input layer of a fully-connected dense neural network layer. Information generated by the dense neural network provides prediction of whether a hardware component will fail in a given future time interval. In addition, in some embodiments, a lagged feedback component from the output is added back to the input layer of the DNN and concatenated to the set of categorical parameters and next sequential higher-dimension parameter set. This enables the system to self-learn and increases robustness.

Use of the present mechanism for determining hardware component failure prediction can have significant monetary and competitive advantages. One example is that a technical support team can provide greater efficiency in preempting possible hardware component issues in a customer environment, thereby increasing customer satisfaction and associated goodwill. In another example, where a portion of the failure prediction mechanism is embedded in the hardware component itself, a component supplier can offer this as a value-add service to customers (e.g., guaranteeing equipment uptime for a monthly fee). As another example, early component failure detection coupled with preventative replacement and automatic monitoring facilitates total productive maintenance in real time.

Companies that have a large installed base of a variety of hardware components can incur significant costs, for example, in the form of technical support during a warranty period to provide maintenance of the components. If there is less than an expected efficiency in providing such service to a customer, there can be a negative ripple effect due to the cost of dissatisfaction. Traditional modes of acting on component failure issues are reactive in nature and thus have the above disadvantages. Such methods typically employed to solve this problem are real-time monitoring systems and a few advanced machine learning approaches.

Embodiments of the present invention utilize a deep-learning based architecture for component failure prediction and address a variety of issues inherent in traditional systems. Such issues include: (1) incorporating a time-series dimension is an input; (2) incorporating a combination of multi-dimensional continuous and categorical parameters with only the continuous parameters having a time-series component; (3) addressing a class imbalance problem between devices that have failed and those that have not failed; (4) ensuring that device observation sequences are weighted based on their importance in their ability to predict a next failure; (5) predicting component failure in any day in a certain window of a future time period; and, (6) providing self-learning for the prediction model.

In solving these issues, embodiments provide a superior, generic solution for failure prediction of any IoT hardware component. As an example, in testing on hard drive data spanning a 14-month period, embodiments of the present invention have achieved an area under the precision-recall curve (APRC) of 85% on a hold-out test sample and 70% on a future unseen sample. In light of the extreme class imbalance ratio of 99:1 for passing drives to failing drives, this is a very high performance. Traditional mechanisms for predicting device failure have a significantly lower accuracy of between 55-60%.

Embodiments of the present invention can be implemented by an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a simplified block diagram of an information handling system 100 that can be used to implement embodiments of the present invention. Information handling system 100 includes a processor (e.g., central processor unit or "CPU") 102, input/output (I/O) devices 104 (e.g., a display, a keyboard, a mouse, and associated controllers), a hard drive or disk storage 106, and various other subsystems 108. The information handling system also includes processing accelerators 109, which, as will be discussed in greater detail below, can include hardware to support artificial intelligence/machine learning operations. In various embodiments, the information handling system 100 also includes network port 110 operable to connect to a network 140, which is likewise accessible by an edge network server 142. The information handling system 100 likewise includes system memory 112, which is interconnected to the foregoing via one or more buses 114. System memory 112 further comprises operating system (OS) 116 and various embodiments also include a predictive maintenance system 118 configured to perform operations in accord with embodiments of the present invention.

Predictive maintenance system 118 includes a data processing module 120 and feature engineering module 122. Described in greater detail below, these modules perform data pre-processing to enhance convergence on a solution for predicting device failure by the DS-LSTM and DNN AI/ML modules (i.e., processing accelerators 109). Data is provided to the system by a plurality of internet of things (IoT) devices 130 and 135 that are connected to information handling system 100 by network 140. IoT devices 130 are coupled to the information handling system via edge network server 142, which can act as an intermediary in gathering data from the IoT devices and providing a desired subset of the data to the information handling system 100 via network port 110.

As will be appreciated, once information handling system 100 is configured to perform operations associated with predictive maintenance, the information handling system becomes a specialized computing device specifically configured to perform those operations and is not a general purpose computing device. Moreover, the implementation of the predictive maintenance system on information handling system 100 provides a useful and concrete result of accurate estimation of when an IoT device is about to fail.

Figure 2A:
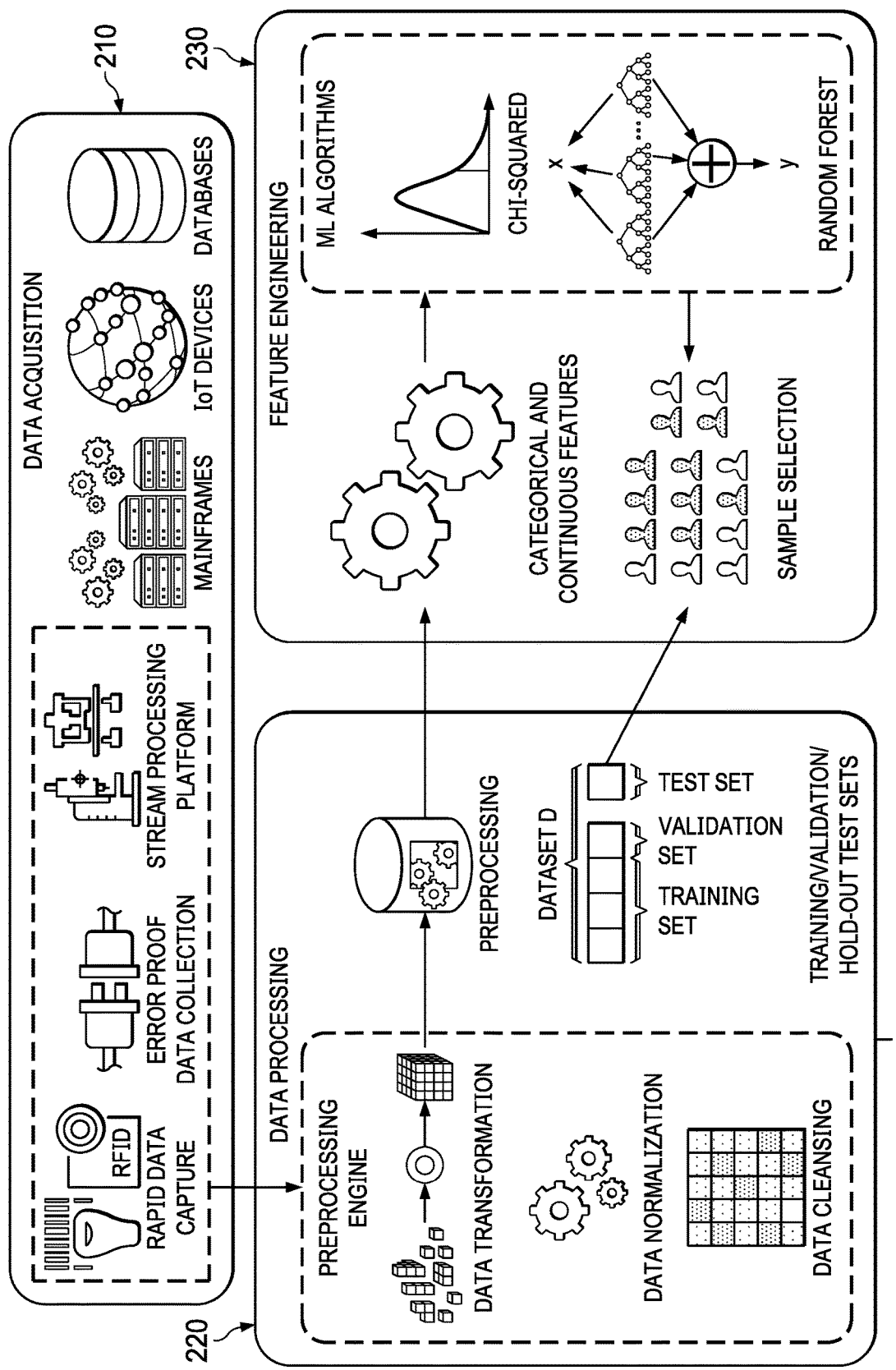
FIGS. 2A and 2B, generally referred to as FIG. 2, is a simplified flow diagram illustrating major stages of performing predictive failure analysis in accord with embodiments of the present invention.
Figure 2B:
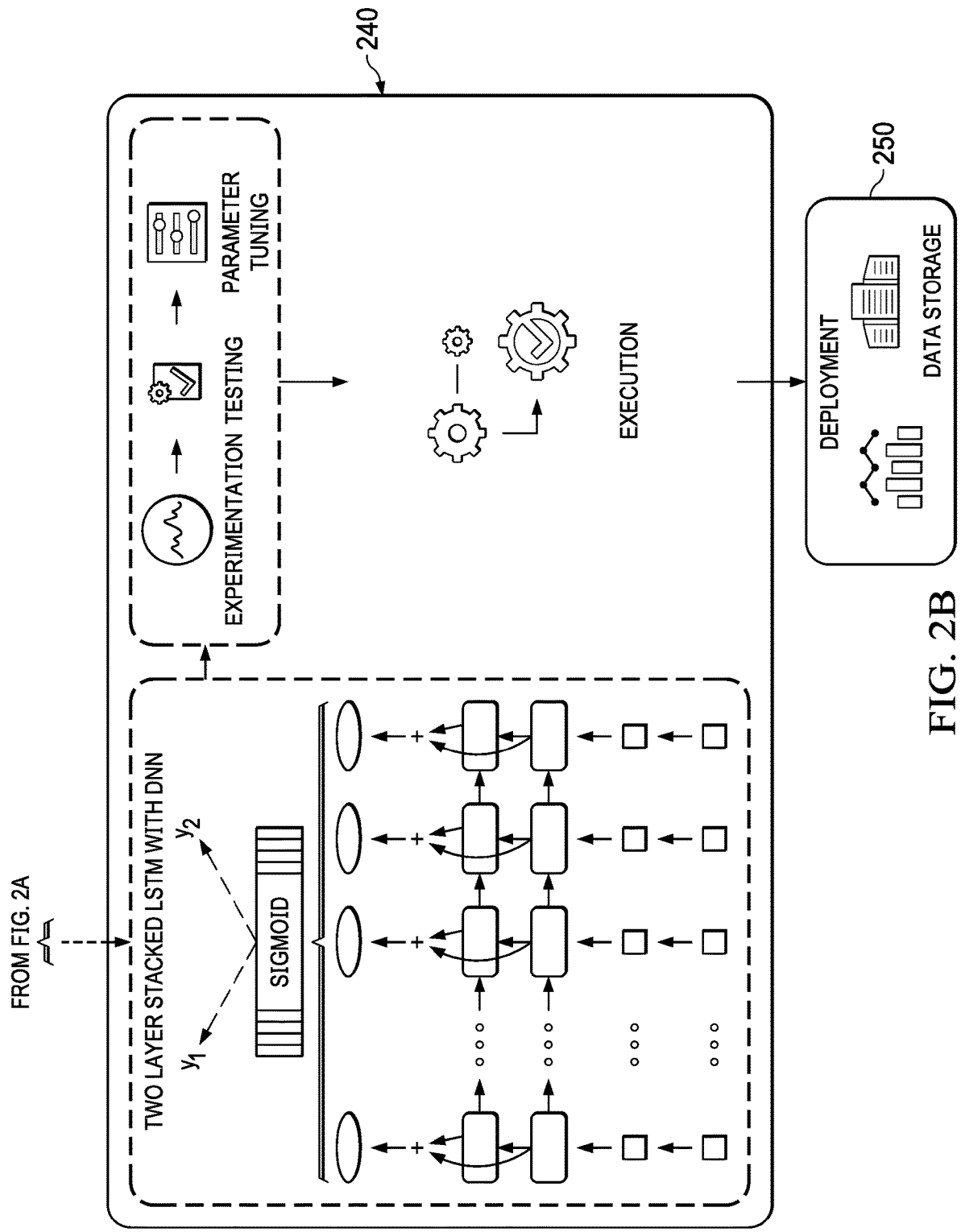

FIG. 2 is a simplified flow diagram illustrating major stages of performing predictive failure analysis in accord with embodiments of the present invention. Each of these stages can be performed by one or more information handling systems, as described above with regard to FIG. 1, and includes one or more actions that will be described in further detail below.

As discussed above, accurately and efficiently predicting device failure depends on proper analysis of large amounts of data collected on hardware devices of interest. Data acquisition stage 210 is an initial stage of the process in which IoT devices coupled to a network (e.g., network 140) provide information about the state of those devices to servers (e.g., information handling system 100 or edge network server 142) that can store the information in one or more databases. In order to ensure timely intervention of potential device failure, quick and error free provision of data related to the hardware devices can be important. A variety of techniques known in the art can be implemented for rapid data capture and error-proof data collection, depending upon the nature of the hardware devices.

As discussed above, embodiments of the invention utilize a double-stacked long-short term memory deep neural network to analyze the data provided by the IoT devices. But to allow for accurate and efficient results to be provided by the deep neural network, the data needs to be preprocessed to better enable the deep neural networks to converge rapidly to a solution that can accurately predict device failure. Data processing stage 220 and feature engineering stage 230 provide such preprocessing. Data processing steps can include data transformation, such as filtering, ordering, normalization, oversampling, and selecting sample sets. Feature engineering techniques can include defining continuous and categorical features, normalization of continuous features, determining those features of greatest impact to device failure, and the like.

Once training and validation datasets are formed that include information relevant to continuous and categorical features, that information can be used to determine a failure prediction model for the hardware device type. Modeling stage 240 utilizes the sample sets to first train the double-stacked long-short term memory deep neural network, and then validate the trained solution to perform additional tuning. Once the solution has been satisfactorily tuned, the solution can be used to help enable failure prediction for devices not included in the sample sets. This information can be provided during deployment stage 250 to business units that can utilize the information in support of customers.

FIG. 3 is a simplified flow diagram illustrating a set of steps involved in data processing stage 240, in accord with embodiments of the present invention. As discussed above, information collected from a set of devices falling in an IoT device type of interest (e.g., a hard disk drive (HDD)) is gathered for analysis. While examples discussed below relate to hard disk drives, embodiments of the present invention are not limited to any particular type of IoT device, and the discussion can be generalized to all IoT devices that generate telemetry data that can be analyzed.

One of the goals in predicting hardware device failure is to capture a pattern of daily change of device telemetry parameters (e.g., amount of data stored, cycle time, backups completed, temperature events, and the like). If there is insufficient information for a particular device, an AI model won't be able to learn a status of the device. To avoid this, devices in the dataset that have less than a minimum threshold of event data throughout the device's history are filtered out of the dataset (310).

In order to train and then validate the solution model, a training dataset and a validation dataset is formed (320). The training dataset is formed from a larger portion of the data than the validation dataset. The validation dataset is used to verify the solution's performance, and for tuning necessary parameters and hyper parameters. Once the training set and validation set are formed, the observation records in each set are ranked in descending order (330). For data from hard disk drives, for example, the most important telemetry records have been determined to be the most recent records. Therefore, the ranked training and validation sets are in reverse chronological order. Such ranking begins to give a structure for how the data will be fed to the AI system for training and validation purposes.

There is a significant imbalance between the number of records associated with devices that have failed and those that have not failed (passing devices). In order to address this imbalance, records related to passing devices and failing devices are treated differently during preprocessing. Thus, each of the training dataset and validation dataset are split into data frames related to devices having passed and devices having failed (340).

Figure 4:
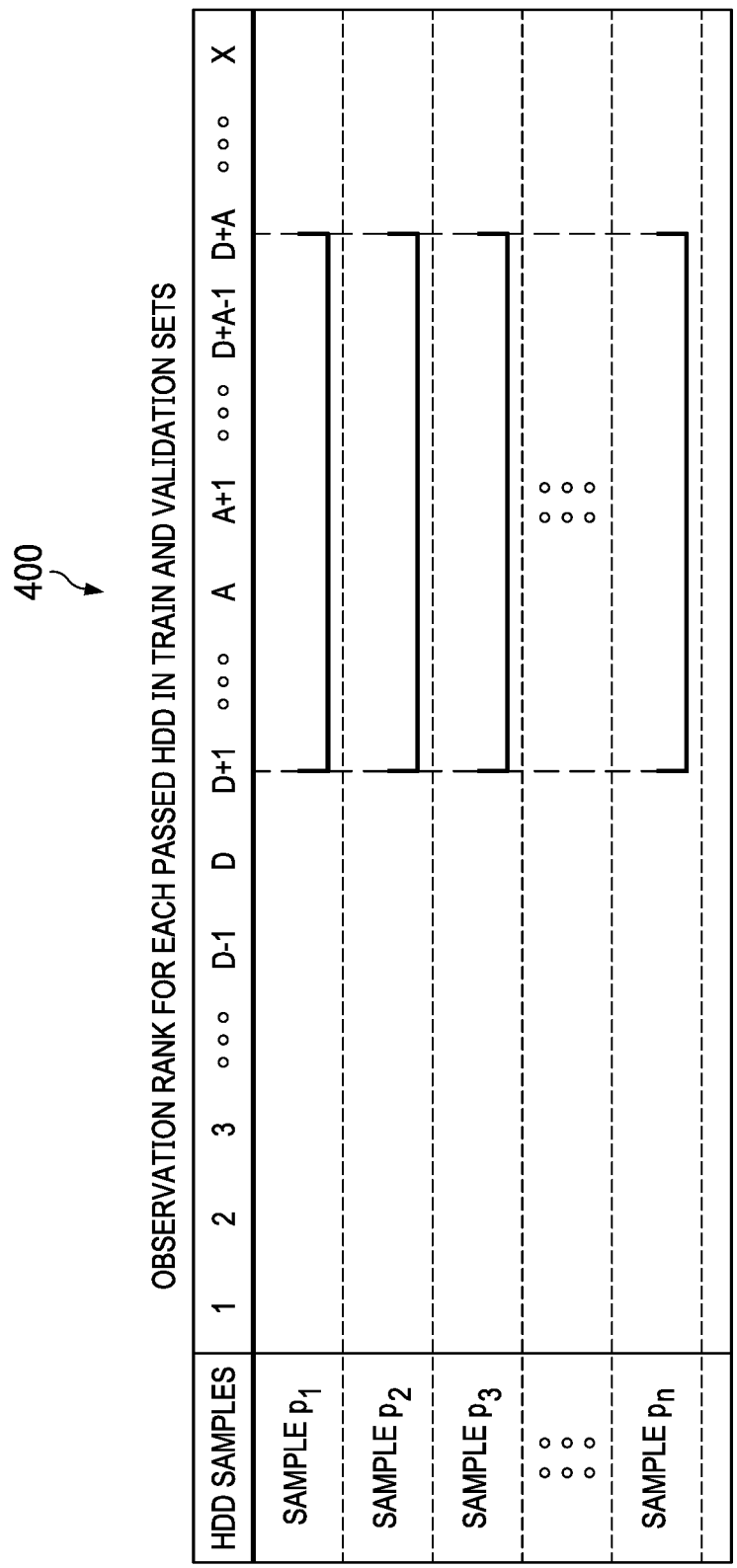
FIG. 4 is a table illustrating an observation ranking for each passing HDD.

FIG. 4 is a table 400 illustrating observation ranking for each passing HDD. A primary object of the solution model is to predict whether an IoT device will fail within the next "d" days. To this end, "a" days of observations are selected for each of the passing device samples in the passing device data frames of both the training and validation datasets based on the ranking performed in step 330 (350). As illustrated in FIG. 4, the range of the ranking is [d+1, d+a] with d+a≤x, where x is the minimum threshold of event data occurrences used in 310.

Figure 5:
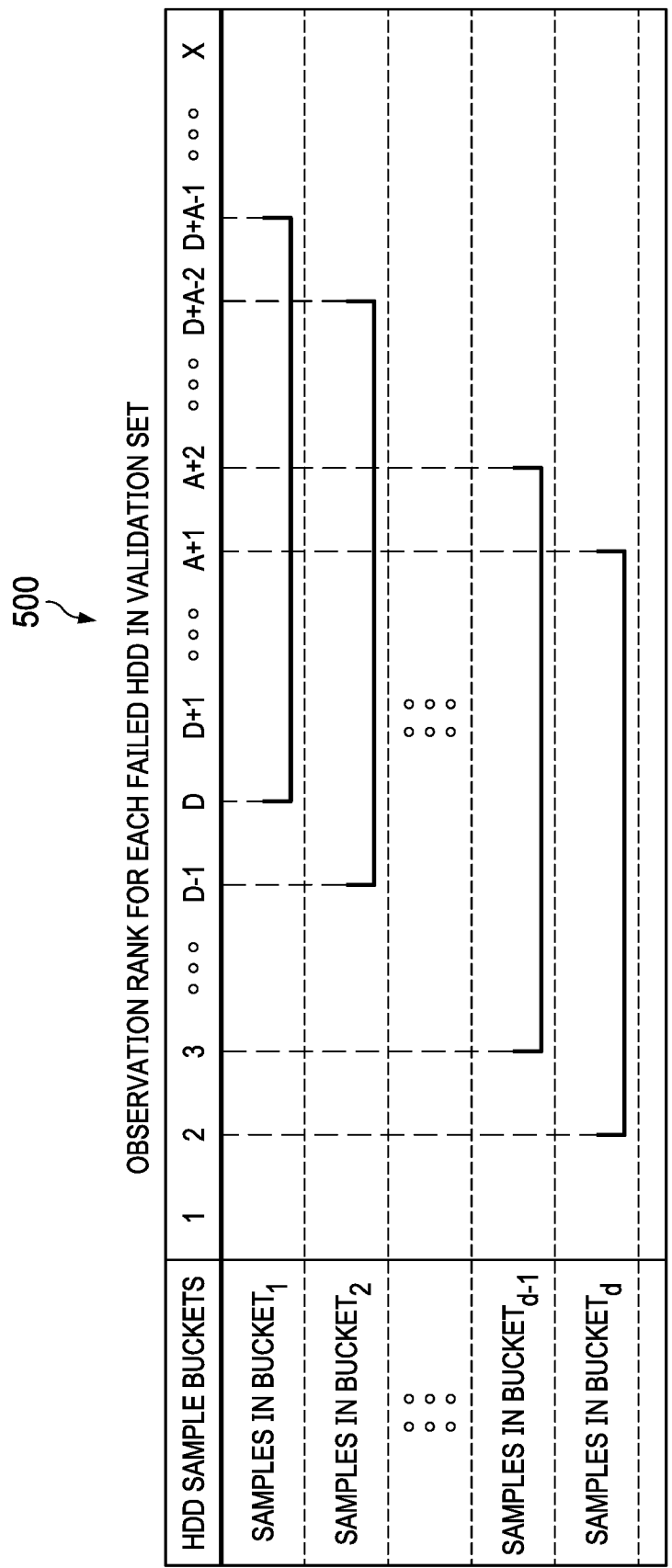
FIG. 5 is a table illustrating an observation ranking for each failed HDD in the validation set.

FIG. 5 is a table 500 illustrating observation ranking for each failed HDD in the validation set, in accord with embodiments of the present invention. Initially, the fn failed samples in the verification set are divided randomly into d equal buckets (e.g., each bucket contains fn/d samples, with a last bucket containing the remainder) (360). For each bucket, "a" days of observations are selected in such a way that for a bucket N the ranks for each HDD sample in that bucket are in a range of [d+2−N, d+a+1−N] (370). As illustrated in FIG. 5, the observation ranks for the samples in the first bucket are in the range of [d+1, d+a]. Similarly, the observation ranks for the samples in the second bucket are in the range of [d, d+1−1], and so forth, until for the last bucket the ranks are in the range of [2, a+1]. One goal of this step is to create a validation set specific to failed HDD samples in a way which indicates that failures may occur in any one of the "d" days (ranging from [1,d]).

Figure 6:
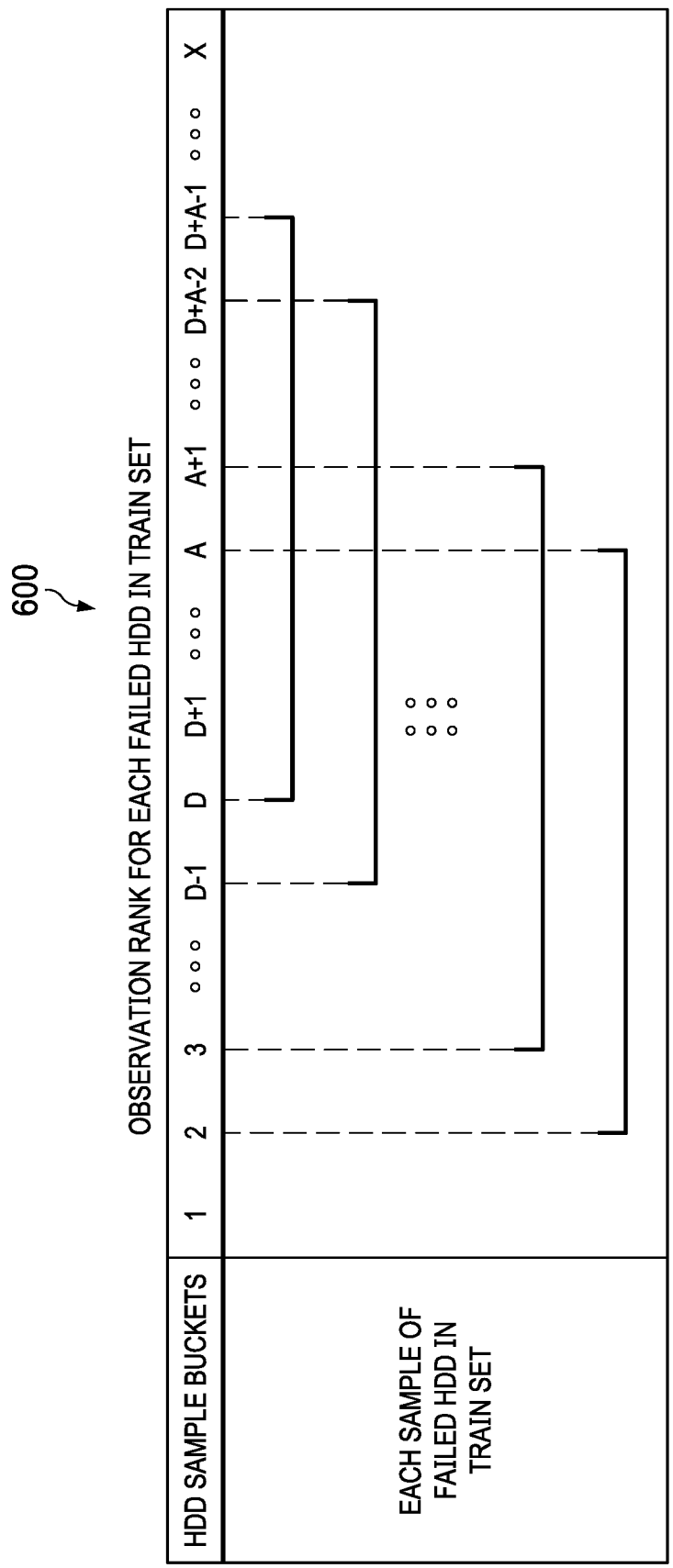
FIG. 6 is a table illustrating observation ranking for each failed HDD in the training set.

FIG. 6 is a table 600 illustrating observation ranking for each failed HDD in the training set, in accord with embodiments of the present invention. For each HDD sample in the training set, "a" observations are selected in such a way that each failed HDD is synthetically oversampled by creating "d" observations. Oversampling is done in part to help create a balance between passing and failing HDDs in the training set, thus making the model better equipped to predict failures in a future unseen data sample. For each failed HDD in the training sample, the "a" observations are selected in such a way that for observation N the observation would be in a range of [d+2−N, d+a+1−N] (380). As illustrated in FIG. 6, the first observation for each HDD sample is in the range of [d+1, d+a]. Similarly, the second observation for each HDD sample is in the range of [d, d+a−1], and so on. This synthetic oversampling of failure-related observations in the training set make sure that failures may occur in any one of the "d" days.

Once the above ranking has been performed for the training and validation datasets, the two datasets can be combined with each entry having an identifier to indicate whether that entry is a member of the validation or training dataset. In addition, a hold-out dataset is created containing information related to HDDs that have yet to fail. FIG. 7 is a table 700 illustrating observation ranking for each of the HDDs that have yet to fail in the hold-out dataset. The observation ranking is performed by taking the latest "a" observations with respect to rank (ranging between [1,a]).

Figure 8:
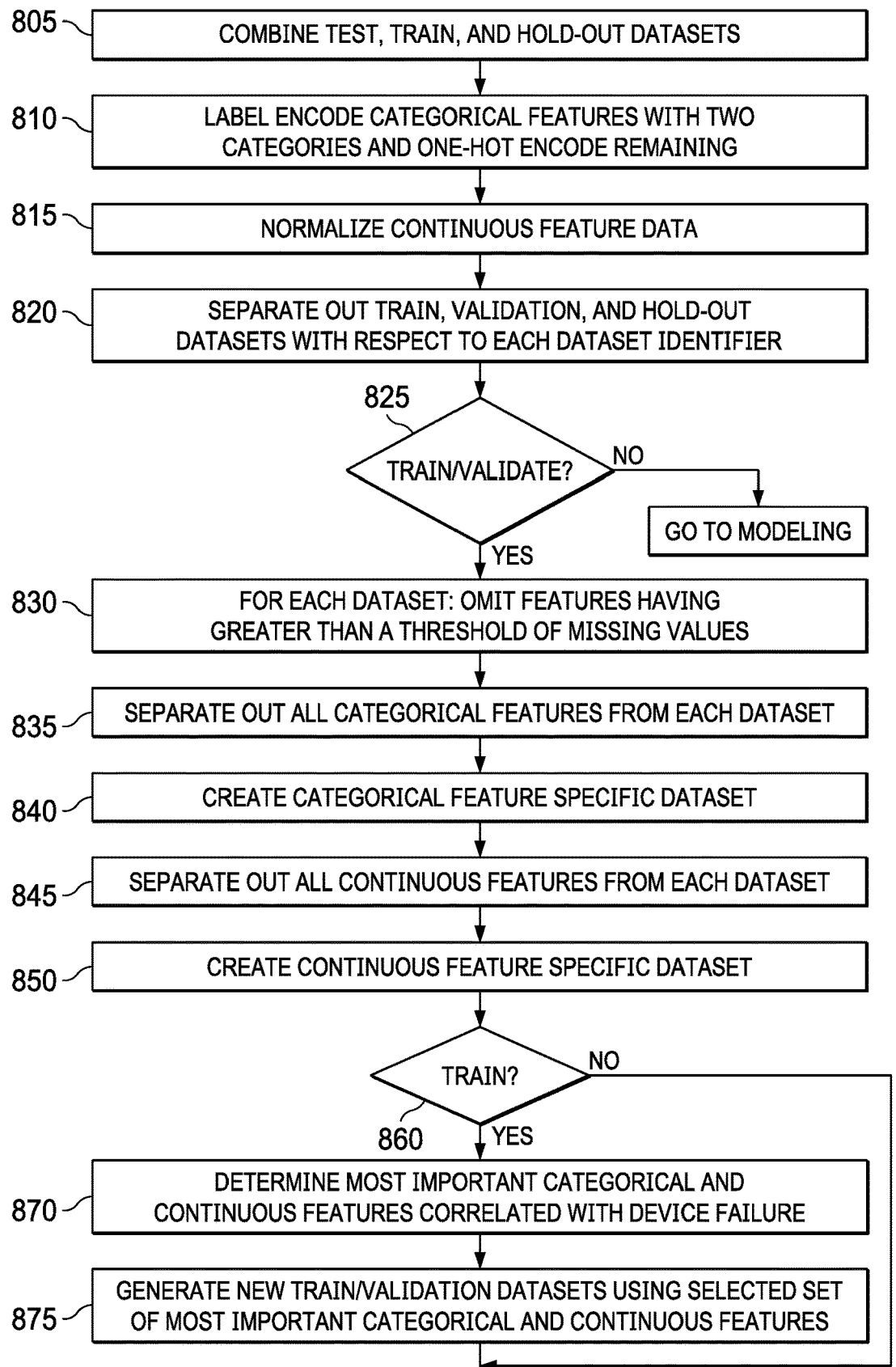
FIG. 8 is a simplified flow diagram illustrating steps associated with data pre-processing and feature engineering, in accord with embodiments of the present invention.

FIG. 8 is a simplified flow diagram illustrating steps associated with data pre-processing and feature engineering, in accord with embodiments of the present invention. The hold-out dataset is combined with the previously combined train and validation datasets with an accompanying identifier for those entries (805). During modeling, the dataset identifiers are used to bifurcate the dataset appropriately. As an initial step to better enable the model to utilize categorical features, categorical features containing two categories are label encoded and the remaining categorical features are one-hot encoded in the combined set (810). One-hot encoding is a process by which categorical variables having more than two categories are converted into a binarized form that can be provided to a machine learning algorithm without the machine learning algorithm interpreting the data as an ordered set. Categorical variables like serial number identifier, target feature, and dataset identifier are neither label encoded nor one-hot encoded because these variables should have no bearing on failure.

Continuous feature data is normalized (815). In one embodiment, the data is normalized using a min-max normalization, such that (a) each feature contributes approximately proportionately while predicting the target feature; and (b) gradient descent converges faster with features scaling than without features scaling. Min-max normalization is a normalization strategy that linearly transforms x to $y=(x-min)/(max-min)$, wherein min and max are minimum and maximum values in X, where X is a set of observed values of x.

After processing the categorical and continuous features, the train, validation, and hold-out datasets are separated out using each dataset identifier (820). Feature selection is then performed for categorical and continuous feature columns of the datasets using the train and validation samples (825). Feature columns having a greater than a predetermined threshold percentage of missing values are omitted from the train and validation datasets (830). The categorical features from each dataset are separated out (835), and a categorical feature-specific dataset is created for each of the train and validation datasets (840). Similarly, the continuous features from each dataset are separated out (845), and a continuous feature-specific dataset is created for each of the train and validation datasets (850).

Figure 9:
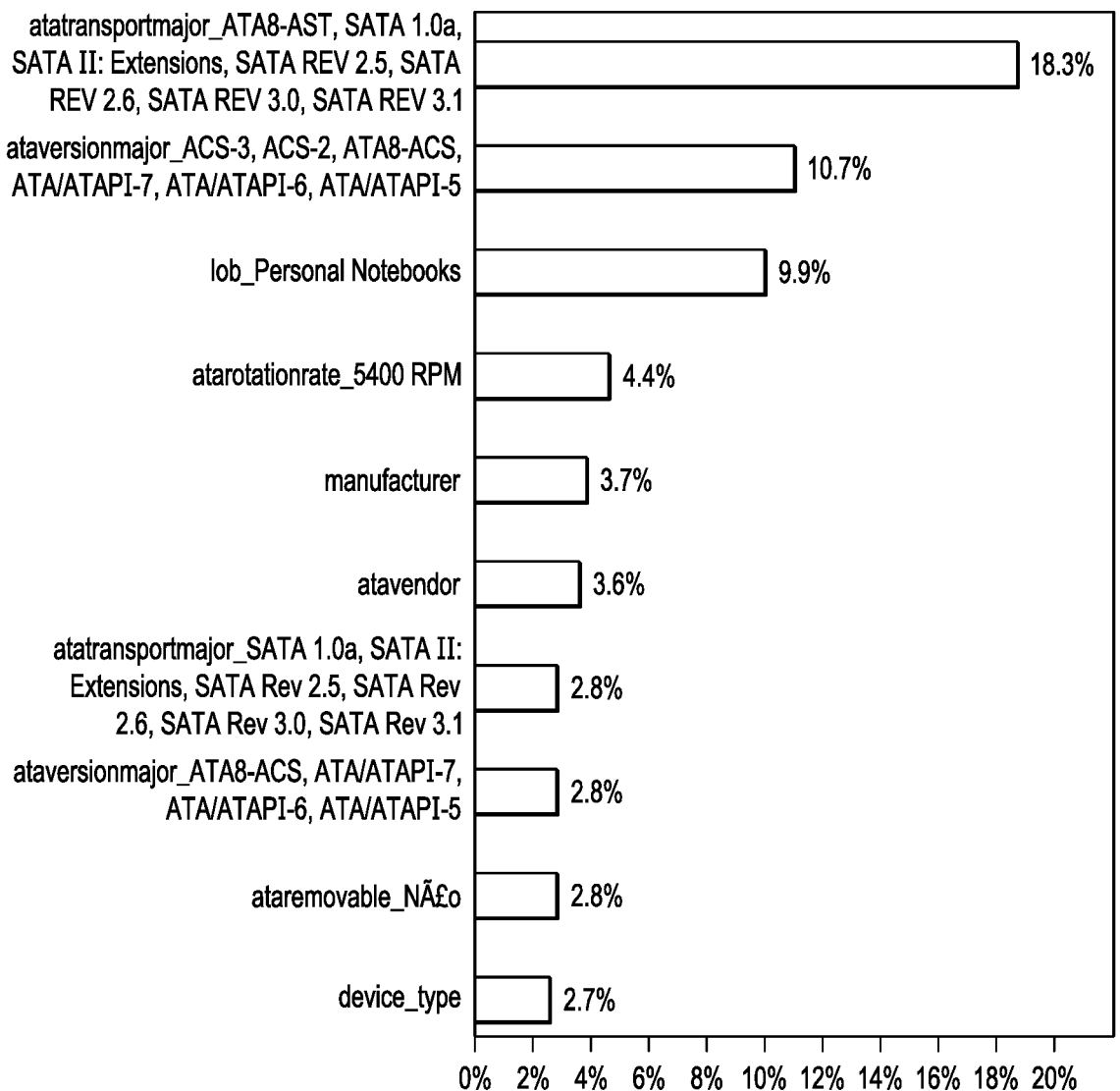
FIG. 9 is an example of random-forest calculated variable importance for categorical features.
Figure 10:
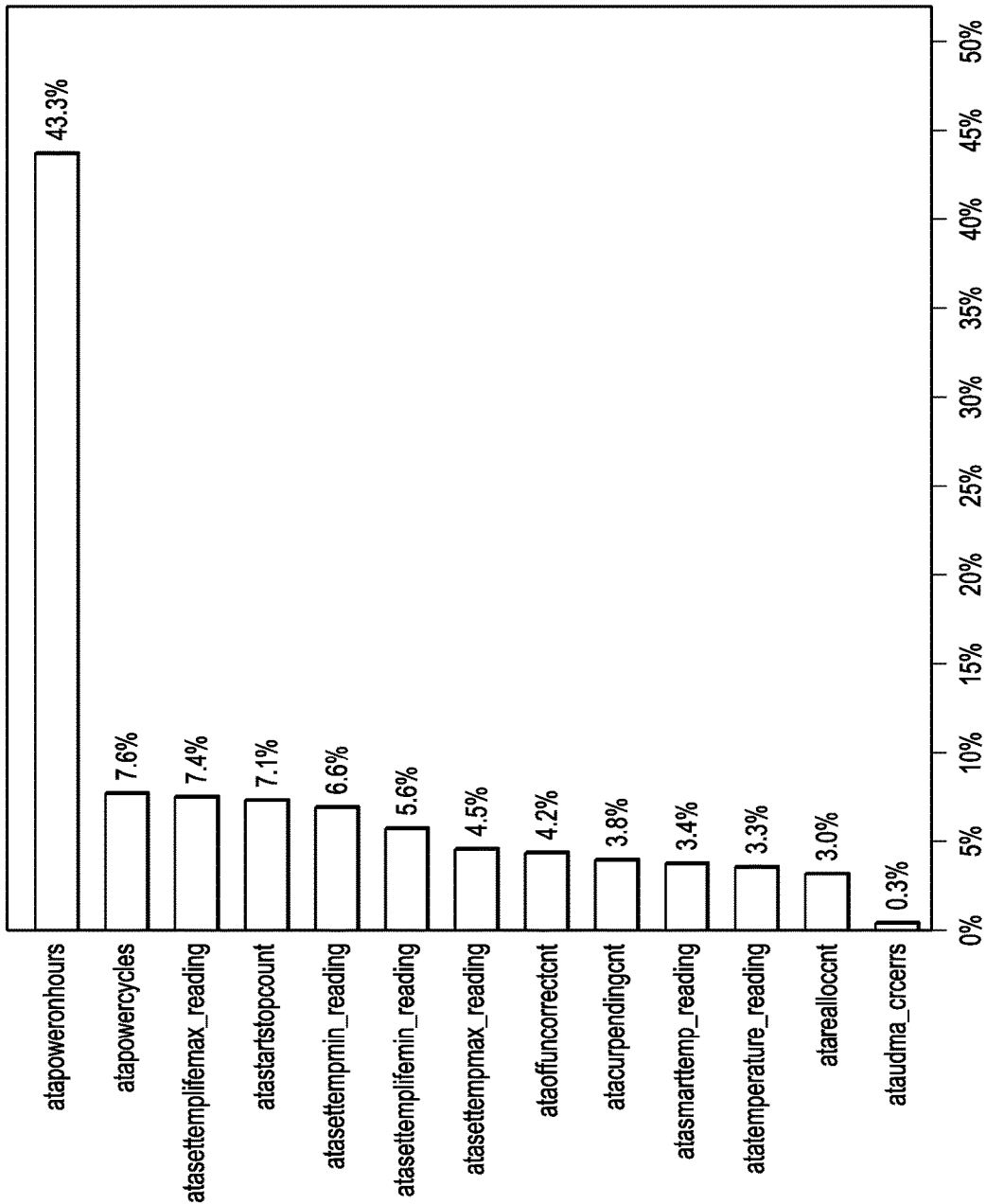
FIG. 10 are examples of random-forest calculated variable importance for continuous features.

For the processed training categorical and continuous feature-specific datasets (860), the most important categorical and continuous features correlated with device failure are determined (870). In one embodiment, a random forest technique is used to determine the most influential features related to failure. For each of the categorical and continuous features related datasets, the top "m" significant variables are taken forward based on the feature importance scores obtained and a final categorical dataset is created containing those "m" features. FIG. 9 and FIG. 10 are examples of random-forest calculated variable importance for categorical features (900) and continuous features (1000), respectively. In each of the figures, the features toward the top of the bar graphs appear to have a greater correlation with device failure. Once the top "m" categorical and continuous features are selected, new training and validation datasets are generated using the selected set of features (875). At this point, the training and validation datasets are ready to be used by the modeling architecture.

Figure 11:
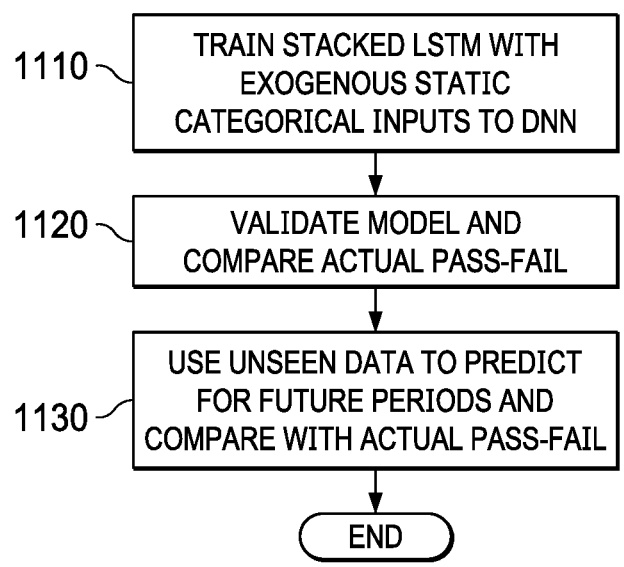
FIG. 11 is a simplified flow diagram illustrating steps involved in the modeling stage 240, in accord with embodiments of the present invention.

FIG. 11 is a simplified flow diagram illustrating steps involved in the modeling stage 240, in accord with embodiments of the present invention. As discussed above, embodiments of the present invention utilize a stacked deep learning architecture for time-variant parameters combined with exogeneous static categorical inputs to a dense neural network. An initial step is to train the stacked LSTM with exogenous static categorical inputs to the DNN (1110), using the training dataset discussed above. Once the system has been trained, validation then occurs using the validation dataset and the results of validation passes are compared to actual past-fail occurrences for tuning of the system (1120). At that point, previously unseen data by the system can be input to predict for future periods and compared to actual past-fail occurrences (1130).

Figure 12:
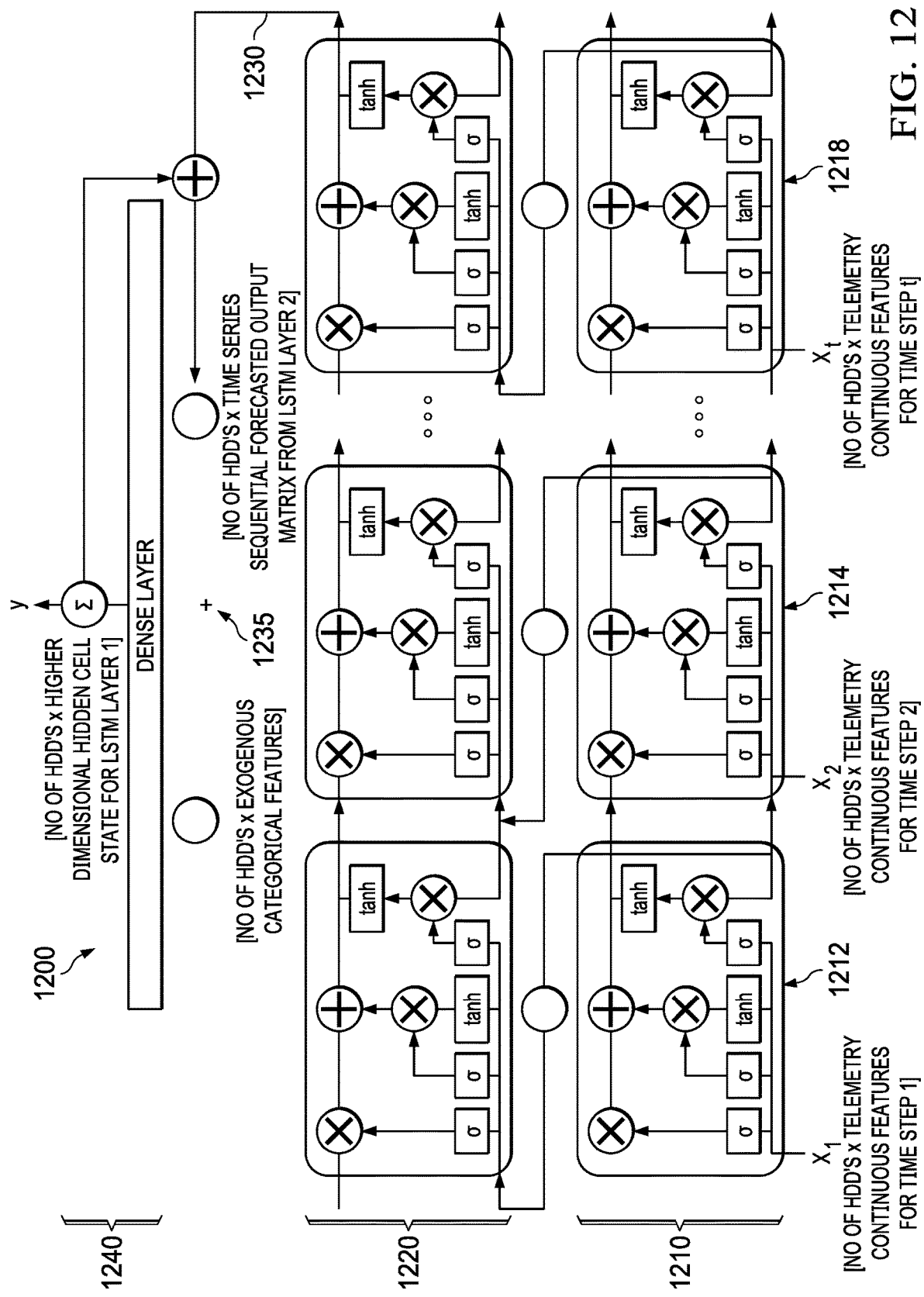
FIG. 12 is a simplified block diagram illustrating an example of a stacked deep learning architecture on time-variant parameters combined with a dense neural network used by embodiments of the present invention.

FIG. 12 is a simplified block diagram illustrating an example of a stacked deep learning architecture on time-variant parameters combined with a dense neural network (1200) used in embodiments of the present invention. The normalized continuous features for all HDDs in the training dataset are used as input to a two-layer stacked LSTM in the form of an array of matrices having a shape of [hdd_train*cont_f*a], where hdd_train represents the number of HDDs in the training dataset, cont_f represents the number of continuous features for each HDD, and "a" represents the number of time steps (e.g., observations) used for each HDD. LSTM first level 1110 is fed with a time series sequence of time steps (or observations) for each HDD. Each time step has a multi-variate combination of about cont_f continuous telemetry indicators. With a total of hdd_train HDDs in the training dataset, this is organized in the form of matrices with a dimension of [hdd_train*cont_f] for each time step. Thus, the LSTM is input with [[hdd_train*cont_f]*a] matrices.

Each time step of LSTM first level 1210 (e.g. 1212, 1214, and 1218) outputs a hidden cell state for each hard drive, which is a vector in a higher dimension LSTM_layer1_dim (e.g., 32, 64, 128). The hidden cell state is stored in a matrix form having a shape [[hdd_train*LSTM_layer1_dim]*a]. The hidden cell state output is fed forward to LSTM second layer 1220 with the output sequence enabled. This results in a single output higher dimension vector for each hard drive having a shape of [hdd_train*LSTM_layer2_dim]. LSTM second layer output 1230 is then concatenated with exogeneous static categorical parameters that have been one-hot encoded resulting in a dimension of vector size being cat_f (1235). The concatenated result matrix with a dimension of [hdd_train*(LSTM_layer2_dim+cat_f)] is fed into a dense neural network 1240. The output layer will have a dependent target variable of failed or passed hard drives of a dimension [hdd_train*1]. Hyperparameter tuning can then be performed to help the model select the best feature combination related to LSTM_layer1_dim and LSTM_layer2_dim, along with other hyperparameters such as dropout rate.

Figure 13:
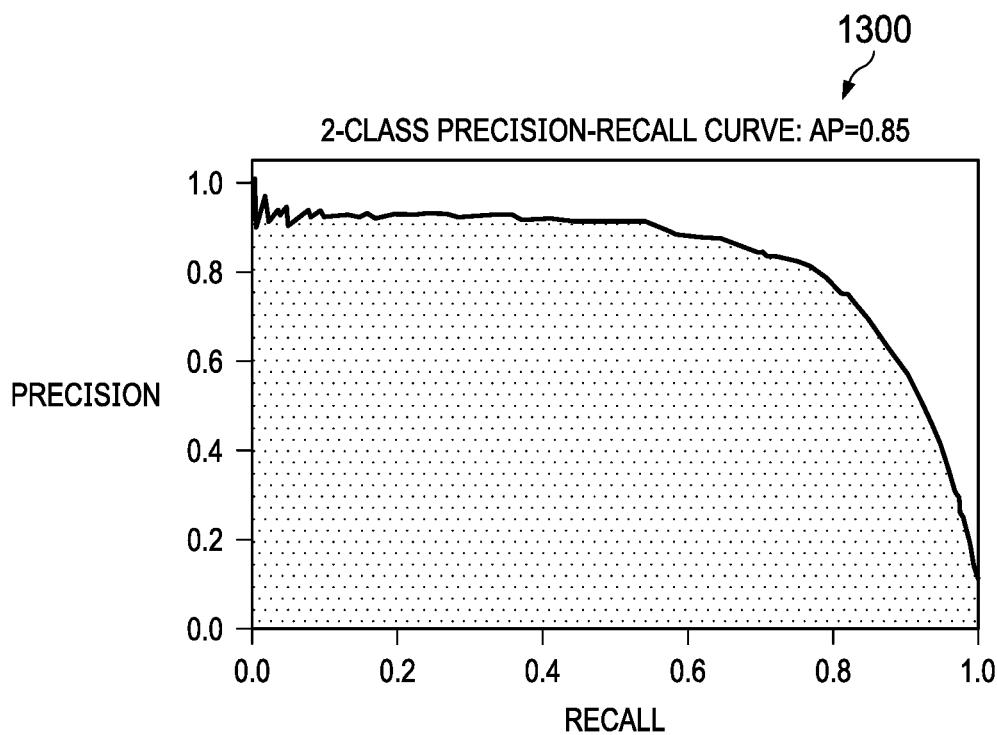
FIG. 13 provides an illustration of the confusion matrix and precision recall curve for an example validation sample.

As discussed above with regard to FIG. 11, once training has been completed, validation of the solution model is then performed (1120). Validation set features having inputs as hdd_validation, along with the same categorical features (e.g., cat_f) and continuous features (e.g., cont_f) as those from the training dataset, our past as inputs to the model. The model then, in turn, outputs the predictions for each hard drive existing in the validation said as passed or failed. These results are compared to the actual target variable and a confusion matrix and precision-recall curve can be plotted. FIG. 13 provides an illustration of the confusion matrix and precision recall curve 1300 for an example validation sample in which an area under the precision recall curve (APRC) of 85% was achieved.

Figure 14:
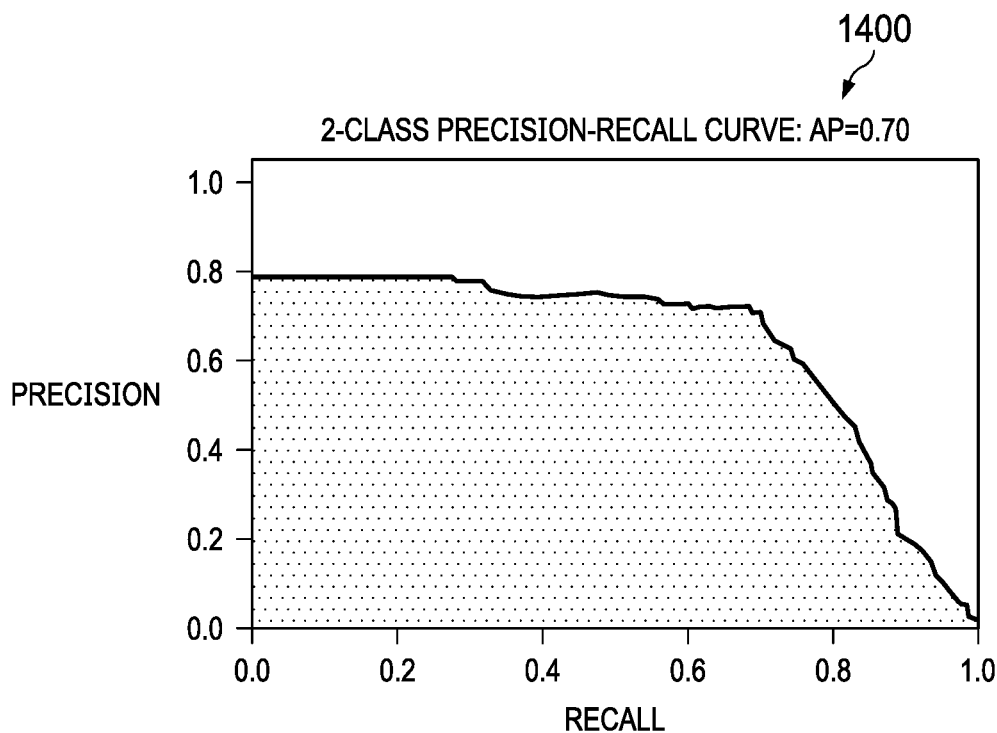
FIG. 14 provides an illustration of a precision recall curve for an example hold-out test sample.

Once validated, the tuned solution can then be used to predict on a hold-out test sample of unseen data for future periods (1130). FIG. 14 provides an illustration of a precision recall curve 1400 for an example hold-out test sample in which an APRC of 70% was achieved.

The extreme class imbalance between passed hard drives and failed hard drives (e.g., 99:1) makes accurate prediction of device failure difficult for traditional failure prediction models. Prior methods of device failure prediction common in the industry are in the region of 55-60%. Embodiments of the present invention, as described above, are providing at least a 10% accuracy improvement over the prior art.

As discussed above, embodiments introduce a unique way of handling class imbalance by synthetically creating repetitive samples of the lower proportion class using a moving time window method. The manner in which the model architecture is designed uniquely provides an initial layer of LSTM that consumes time series specific multi-dimensional input parameters to output a hidden cell state at each time step. The next layer of LSTM consumes the hidden cell states from the first layer and further outputs a single next sequential higher-dimension parameter set. This output of the two-layer stacked LSTM is then concatenated with a set of non-varying categorical parameters which are fed to a fully connected dense neural network. The DNN has an output layer that determines if the hardware component fails in a given future time interval. In addition, there is also a lagged feedback loop from the output layer of the DNN to the DNN input layer that is concatenated to the existing set of categorical and next sequential higher-dimension parameter set to enhance model self learning and robustness.

The failure prediction system discussed above is designed such that it is generic and can be used for any IoT hardware components that are connected to provide telemetry data. While the above discussion has focused on an example of hard disk drives, embodiments are not limited to HDDs, but can be applied to any IoT device.

As will be appreciated by one skilled in the art, the present invention may be embodied as a method, system, or computer program product. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for predicting failure of a hardware device, the method comprising:
   acquiring telemetry data from a plurality of hardware devices of a same type;
   generating a training dataset and a validation dataset from the telemetry data, wherein each dataset comprises a set of data observations over time for each device in the dataset;
   training a model for predicting failure of a hardware device of the plurality of hardware devices, wherein said training uses a modified version of the training dataset, and
   said training comprises
      providing cells of a first layer of a double stacked long short-term memory (DS-LSTM) network with a normalized continuous feature set of time observations for each device in the training dataset wherein each cell of the first layer of the DS-LSTM outputs a hidden cell state,
      providing the hidden cell state of each first layer cell to a corresponding cell in a second layer of the DS-LSTM wherein the second layer of the DS-LSTM outputs an output vector for each device in the training dataset,
      concatenating the output vector for a device with categorical parameters corresponding to the device from the training dataset to generate a concatenated result matrix for the device, and
      providing the concatenated result matrix to a dense neural network (DNN) to identify continuous and categorical parameters related to device failure as an output from the DNN; and
   tuning the model, wherein said tuning uses a modified version of the validation dataset to further rank continuous and categorical parameters related to device failure.

2. The method of claim 1 further comprising generating the modified versions of the training dataset and the validation dataset, wherein said generating the modified versions comprises:

ranking the set of data observations in each of the training and validation datasets in reverse chronological order;

splitting each of the training and validation datasets into a set of records associated with failed devices and passing devices; and generating an oversampled set of observations from the set of records associated with failed devices in the training dataset to address imbalance between a number of records in the set of records associated with failed devices and passing devices.

3. The method of claim 2, wherein said generating the oversampled set of observations from the set of records associated with failed devices in the training dataset further comprises synthetically creating repetitive samples using a moving time window.

4. The method of claim 3, said synthetically creating repetitive samples using a moving time window further comprises:

generating an oversampled set of observations d from a actual observations such that for observation n in the set of observations, the observation is in a date range characterized by d+2−n, d+a+1−n, where d, a and n are positive integers greater than 1.

5. The method of claim 2, wherein said generating the modified versions further comprises:

generating a set of observations from the set of records associated with failed devices in the validation dataset by further performing steps of dividing the records associated with the failed devices in the validation dataset into d buckets, and selecting, for each bucket, a days of observations such that for bucket n the ranks for each observation is in a range of d+2−n, d+a+1−n, where d, a and n are positive integers greater than 1.

6. The method of claim 1 further comprising:

concatenating the output from the DNN to a next concatenated result matrix to form a concatenated result matrix for a next DNN calculation.

7. The method of claim 1, wherein each of the plurality of hardware devices is an internet of things device configured to provide the telemetry data over a network.

8. The method of claim 1 further comprising:

generating a hold-out dataset from the telemetry data, wherein the hold-out dataset is used to determine accuracy of the model subsequent to said training and tuning, and the hold-out dataset comprises entries distinct from the entries in the training and validation datasets.

9. A system comprising:

a processor;

a data bus coupled to the processor;

a double stacked long short-term memory (DS-LSTM) module, coupled to the processor, and having a plurality of first layer cells and corresponding plurality of second layer cells, wherein each cell of the first layer cells is configured to provide a hidden cell state to a corresponding cell of the second layer cells;

a dense neural network (DNN) module, coupled to the DS-LSTM module and the processor, and configured to receive an output from the DS-LSTM as an input; and a non-transitory, computer-readable storage medium embodying computer program code, the non-transitory, computer-readable storage medium being coupled to the data bus, the computer program code interacting with a plurality of computer operations and comprising instructions executable by the processor and configured for:

acquiring telemetry data from a plurality of hardware devices of a same type, generating a training dataset and a validation dataset from the telemetry data, wherein each dataset comprises a set of data observations over time for each device in the dataset, training a model for predicting failure of a hardware device of the plurality of hardware devices, wherein said training uses a modified version of the training dataset, and said training comprises providing the plurality of first layer cells of the DS-LSTM with a normalized continuous feature set of time observations for each device in the training dataset, outputting an output vector by the second layer of the DS-LSTM for each device in the training dataset, concatenating the output vector for a device with categorical parameters corresponding to the device from the training dataset to generate a concatenated result matrix for the device, and providing the concatenated result matrix to the DNN module for identifying continuous and categorical parameters related to device failure, and tuning the model, wherein said tuning uses a modified version of the validation dataset to further rank continuous and categorical parameters related to device failure.

10. The system of claim 9, wherein the instructions executable by the processor are further configured for generating the modified versions of the training dataset and the validation dataset, wherein the instructions are configured for:

ranking the set of data observations in each of the training and validation datasets in reverse chronological order;

splitting each of the training and validation datasets into a set of records associated with failed devices and passing devices; and generating an oversampled set of observations from the set of records associated with failed devices in the training dataset to address imbalance between a number of records in the set of records associated with failed devices and passing devices.

11. The system of claim 10 wherein the instructions for generating the oversampled set of observations from the set of records associated with failed devices in the training dataset further comprise instructions configured for synthetically creating repetitive samples using a moving time window.

12. The system of claim 11 wherein the instructions for synthetically creating repetitive samples using a moving time window further comprise instructions configured for generating an oversampled set of observations d from a actual observations such that for observation n in the set of observations, the observation is in a date range characterized by d+2−n, d+a−1−n, where d, a and n are positive integers greater than 1.

13. The system of claim 10, wherein the instructions configured for generating the modified version of the validation dataset are further configured for generating a set of observations from the set of records associated with failed devices in the validation dataset by further comprising instructions to divide the records associated with the failed device in the validation dataset into d buckets, and select, for each bucket, a days of observations such that for bucket n the ranks for each observation is in a range of d+2−n, d+a+1−n, where d, a and n are positive integers greater than 1.

14. The system of claim 9, wherein the instructions are further configured for
generating a hold-out dataset from the telemetry data, wherein
the hold-out dataset is used to determine accuracy of the model subsequent to said training and tuning, and
the hold-out dataset comprises entries distinct from the entries in the training and validation datasets.

15. The system of claim 9 further comprising:
a network interface, coupled to the data bus and a network, wherein each of the plurality of hardware devices is an internet of things device configured to provide the telemetry data over the network.

16. A non-transitory, computer-readable storage medium embodying computer program code, the computer program code comprising computer executable instructions configured for:
acquiring telemetry data from a plurality of hardware devices of a same type;
generating a training dataset and a validation dataset from the telemetry data, wherein each dataset comprises a set of data observations over time for each device in the dataset;
training a model for predicting failure of a hardware device of the plurality of hardware devices, wherein
said training uses a modified version of the training dataset, and
said training comprises
providing cells of a first layer of a double stacked long short-term memory (DS-LSTM) network with a normalized continuous feature set of time observations for each device in the training dataset wherein each cell of the first layer of the DS-LSTM outputs a hidden cell state,
providing the hidden cell state of each first layer cell to a corresponding cell in a second layer of the DS-LSTM wherein the second layer of the DS-LSTM outputs an output vector for each device in the training dataset,
concatenating the output vector for a device with categorical parameters corresponding to the device from the training dataset to generate a concatenated result matrix for the device, and
providing the concatenated result matrix to a dense neural network (DNN) to identify continuous and categorical parameters related to device failure as an output from the DNN; and
tuning the model, wherein said tuning uses a modified version of the validation dataset to further rank continuous and categorical parameters related to device failure.

17. The non-transitory, computer-readable storage medium of claim 16, wherein the computer executable instructions are further configured for generating the modified versions of the training dataset and the validation dataset, wherein the instructions for generating the modified versions are configured for:
ranking the set of data observations in each of the training and validation datasets in reverse chronological order;
splitting each of the training and validation datasets into a set of records associated with failed devices and passing devices; and
generating an oversampled set of observations from the set of records associated with failed devices in the training dataset to address imbalance between a number of records in the set of records associated with failed devices and passing devices.

18. The non-transitory, computer-readable storage medium of claim 17, wherein the instructions for generating the oversampled set of observations from the set of records associated with failed devices in the training dataset further comprise instructions for synthetically creating repetitive samples using a moving time window.

19. The non-transitory, computer-readable storage medium of claim 16, wherein the instructions for synthetically creating repetitive samples using the moving time window further comprise instructions for generating an oversampled set of observations d from a actual observations such that for observation n in the set of observations, the observation is in a date range characterized by d+2−n, d+a+1−n, where d, a and n are positive integers greater than 1.

20. The non-transitory, computer-readable storage medium of claim 16, wherein the instructions for generating the modified versions further comprise instructions for:
generating a set of observations from the set of records associated with failed devices in the validation dataset by further performing steps of
dividing the records associated with the failed devices in the validation dataset into d buckets, and
selecting, for each bucket, a days of observations such that for bucket n the ranks for each observation is in a range of d+2−n, d+a+1−n, where d, a and n are positive integers greater than 1.

* * * * *